United States Patent [19]
Nakai et al.

[11] 3,951,531
[45] Apr. 20, 1976

[54] MOTION PICTURE CAMERA WITH EXPOSURE TIME PROLONGING MEANS

[75] Inventors: Hiroshi Nakai, Yono; Tetsuo Nishizawa, Kawagoe; Ziro Sekine, Koshigaya, all of Japan

[73] Assignee: Fuji Photo Optical Co., Ltd., Omiya, Japan

[22] Filed: Dec. 5, 1974

[21] Appl. No.: 529,752

[30] Foreign Application Priority Data
July 15, 1974 Japan.................................. 49-80889

[52] U.S. Cl............................... 352/216; 352/180; 352/194
[51] Int. Cl.²......................................... G03B 9/10
[58] Field of Search ............ 352/216, 217, 194, 180

[56] References Cited
UNITED STATES PATENTS
3,196,457   7/1965   Buck................................... 352/216
FOREIGN PATENTS OR APPLICATIONS
2,139,523   3/1972   Germany............................ 352/216

Primary Examiner—Monroe H. Hayes

[57] ABSTRACT

A rotary shutter of a motion picture camera comprises a pair of fan-shaped sectors which are capable of changing the angle of opening formed thereby. The sector shaft is rotated through a gear train by a claw driving shaft which in turn is rotated by a driving motor. The gear train comprises a pair of gear train means either of which is selectively used to transmit the rotation of the claw driving shaft to the sector shaft. The ratio of the rate of revolution of one shaft to that of the other is changed by changing the gear train means. A switchover means is provided to switchover the gear train from one to the other. The switchover means is associated with means for changing the angle of opening formed by the sectors. In the mode of the prolonged time exposure, the speed of revolution of the sector is reduced to the half of that of the sector in the mode of the normal motion picture. The claw is caused to be out of engagement with the perforation of the film during every other reciprocal movement of the claw so that the film will remain stationary during every other reciprocal movement of the claw to effect a prolonged exposure time.

5 Claims, 5 Drawing Figures

MOTION PICTURE CAMERA WITH EXPOSURE TIME PROLONGING MEANS

BACKGROUND OF THE INVENTION

1. Field of the Invention

This invention relates to a motion picture camera, and more particularly to an exposure time prolonging means provided in a motion picture camera of the type which employs a rotary shutter blade comprising a sector means.

2. Description of the Prior Art

When using a conventional motion picture camera which is designed to take normal motion pictures with a predetermined exposure time and at a preselected frequency (such as 18 or 24 frames per second), an illuminating device must be used in twilight, at night or under other circumstances when the intensity of scene light is low so as to obtain motion pictures of normal quality. However, it is undesirable to use an illuminating device from the viewpoint of the quality of pictures since it is often desired to obtain delicate shade distribution and soft contrast of the scene. Further, it is troublesome to carry and operate the illuminating device together with the motion picture camera.

In view of the above-mentioned drawbacks of the conventional motion picture cameras, it has been proposed to design a motion picture camera which is able to obtain substantially bright motion pictures under circumstances when the intensity of scene light is low. There are two ways to make it possible for a motion picture camera to obtain normal motion pictures under low intensity of light. One is to lower the F-number of the taking lens of the camera and the other is to prolong the exposure time.

The exposure time of the motion picture camera can be prolonged either by enlarging the angle of opening of the sector of the rotary shutter blades or lowering the frequency of the frame feed. The frequency or the frame speed of the film feed, however, must be higher than the standard frame speed 18fr/sec, and accordingly, the frame speed is subject to a lower limit. Therefore, the best way to prolong the exposure time is to enlarge the angle of opening of the sector of the rotary shutter blades.

The enlargement of the angle of opening of the sector of the rotary shutter blades results in reduction in the angle of the non-opening portion of the sector portion of the shutter. Therefore, in order to enlarge the opening angle of the shutter, the claw which intermittently pulls down the film must be quickly moved so that the claw may feed one frame of the film while the light coming through the taking lens is intercepted by the non-opening portion of the sector.

In the mechanism for performing the above operation of the claw, there is a great problem caused by the difference in the characteristic of the motion (non-uniform cyclic motion) of the claw and that of the motion (uniform cyclic motion) of the control cam for controlling the motion of the claw. For instance, in conventional cameras in which a so-called triangular cam is used for controlling the claw, the claw is driven by a claw controlling mechanism which creates an abruptly changing acceleration. Owing to the abruptly changing acceleration, the image stability on the film is lowered.

SUMMARY OF THE INVENTION

In view of the above described defects inherent in conventional motion picture cameras, the primary object of the present invention is to provide a motion picture camera provided with an exposure time prolonging means.

Another object of the present invention is to provide a motion picture camera provided with an exposure time prolonging means employing a rotary shutter having high image stability in the taking of high speed motion pictures.

Still another object of the present invention is to provide a motion picture camera in which switchover between normal operation and prolonged shutter exposure operation can be accomplished by a simple switchover means.

A further object of the present invention is to provide a motion picture camera in which a claw control member such as an excentric cam or pin performs a uniform cyclic motion and does not creat an abrupt change in acceleration, thereby performing stable film feeding.

In the motion picture camera exposure time prolonging means in accordance with the present invention, there is provided a rotary shutter comprising a pair of fan-shaped sectors which are capable of changing the angle of opening formed thereby. The sector shaft is rotated through a gear train by a claw driving shaft which in turn is rotated by a driving motor. The gear train comprises a pair of gear train means either of which is selectively used to transmit the rotation of the claw driving shaft to the sector shaft. The ratio of the rate of revolution of one shaft to that of the other is changed by changing the gear train means. A switchover means is provided to switch from one gear train to the other. The switchover means is associated with means for changing the angle of the opening formed by the sectors.

In the mode of prolonged time exposure, the speed of revolution of the sector is reduced to half of that of the sector in the mode of the normal motion picture. The claw is caused to be out of engagement with the perforation of the film during every other reciprocal movement of the claw so that the film will remain stationary during every other reciprocal movement of the claw to effect prolonged exposure time operation. Thus, the exposure time is simply prolonged by operating the switchover means.

PREFERRED EMBODIMENT OF THE INVENTION

Figure 1:
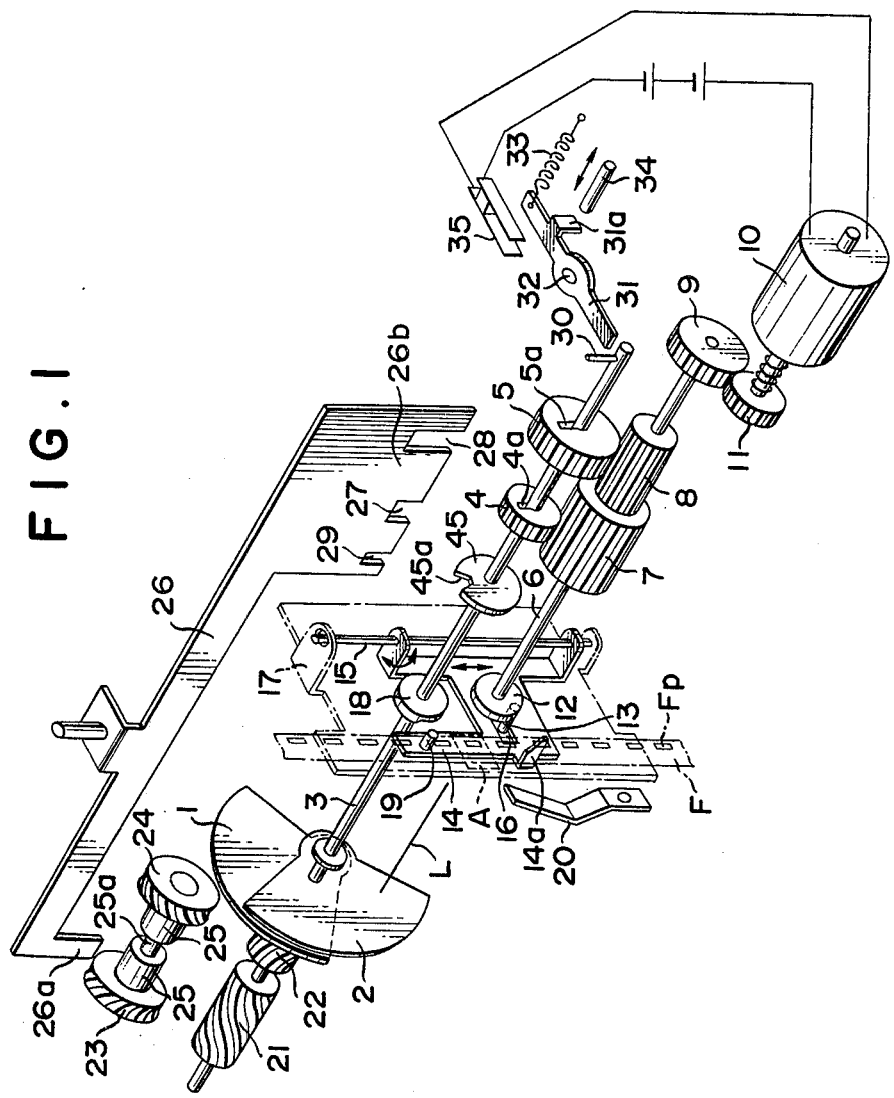
FIG. 1 is a perspective view showing the mechanism for prolonging the exposure time in a motion picture camera in accordance with an embodiment of the present invention.
Figure 2:
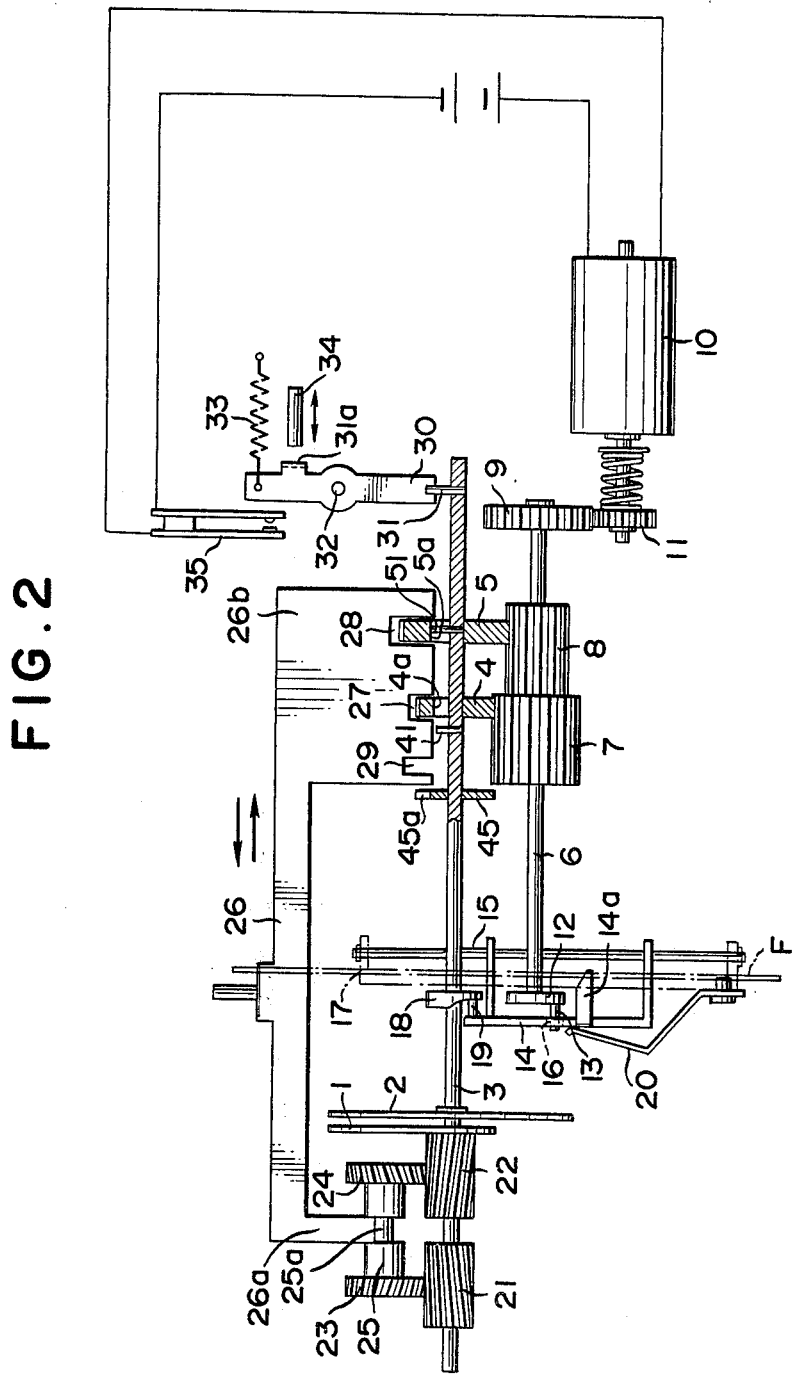
FIG. 2 is a longitudinal cross sectional view showing the mechanism for prolonging the exposure time in a motion picture camera in accordance with the embodiment shown in FIG. 1.

Referring to FIGS. 1 and 2 which show the details of construction of the mechanism for prolonging the exposure time in a motion picture camera in accordance with an embodiment of the present invention, a pair of fan-shaped thin sectors 1 and 2 are mounted on a sector shaft 3. One sector 1 is rotatably mounted on the shaft 3 and the other sector 2 is fixed thereto. Two spur gears 4 and 5 are mounted on the sector shaft 3 and made axially slidable therealong. A claw driving shaft 6 provided in parallel to the sector shaft 3 is provided with two axially elongated gears 7 and 8 fixed thereto and having a different number of teeth. The claw driving shaft 6 is further provided at an end thereof with a spur gear 9 which in turn is engaged with a drive gear 11 of a driving motor 10. Thus, the claw shaft 6 and the sector shaft 3 are uniformly rotated by the driving motor 10. At the other end of the claw driving shaft 6 is fixed an end plate 12 having an eccentric pin 13. A claw plate 14 extending substantially perpendicular to the shafts 3 and 6 and having a claw 14a is provided to be vertically slid up and down guided along a guide bar 15. The claw 14a has a flat lower face and a tapered upper face as shown in FIG. 1. The claw plate 14 has a horizontally extending slot 16 through which said eccentric pin 13 extends in engagement therewith so that the claw plate 14 may be slid up and down by the rotation of the end plate 12 having the eccentric pin 13. Said guide bar 15 is fixed to a stationary gate plate 17 and guides the claw plate 14 in the vertical direction. Further, the claw plate 14 is horizontally swingable about the guide bar 15. The sector shaft 3 is provided with a face cam 18 and the claw plate 14 is provided with a cam follower pin 19 which follows the face of the face cam 18. A leaf spring 20 is provided to spring urge the claw plate 14 in the direction to put the cam follower pin 19 into contact with the face cam 18. The claw plate 14 is therefore slid up and down and swung about the guide bar 15 at the same time to feed the film F one frame by one frame. The film perforations provided in the film F to be engaged with the claw 14a are indicated with the reference character Fp. The reference character A indicates the aperture of the motion picture camera and the character L indicates the optical axis of the taking lens of the camera. The relationship between the motion of the claw 14a and the sectors 1 and 2 very much resembles that between the sector and claw of a conventional motion picture.

In the present invention, the two sectors 1 and 2 are angularly displaceable with respect to each other to change the angle of opening formed thereby. Further, the relationship between the motion of the claw 14a and the motion of the sectors 1 and 2 is changed when the angle of opening formed by the sectors 1 and 2 is changed.

The sector shaft 3 is further provided with an axially elongated helical gear 21 fixed thereto and another axially elongated helical gear 22 rotatably mounted thereon and fixed to said fan-shaped sector 1 which is rotatably mounted on the shaft 3. The elongated helical gear 22 is quite the same as the elongated helical gear 21 in construction except that the direction of its helix is opposite. The helical gears 21 and 22 on the sector gear shaft 3 are engaged with two helical gears 23 and 24, respectively. The helical gears 23 and 24 are fixed to each other by way of a shaft 25 having a recessed portion 25a. As clearly shown in FIG. 2, the sector shaft 3 has two keys 41 and 51 to be engaged with key ways 4a and 5a of the spur gears 4 and 5. The spur gear 4 or 5 transmits the rotation of the claw driving shaft 6 to the sector shaft 3 only when the key way thereof 4a or 5a is engaged with the key 41 or 51 of the sector shaft 3. Further, the sector shaft 3 is always associated with the claw shaft 6 by way of either the spur gear 4 and the elongated gear 7 or the other spur gear 5 and the other elongated gear 8. That is, at least one of the two spur gears 4 and 5 transmits the rotation of the claw driving shaft 6 to the sector shaft 3. There is provided a switchover means to switchover the transmission of the rotation from one gear set to the other. In this embodiment, a manually operable switchover lever 26 extending from said helical gears 23 and 24 to said spur gears 4 and 5 is provided for switching over the transmission between gears 4 and 5. One end 26a of the switchover lever 26 extends into said recessed portion 25a of the shaft 25 of the helical gears 23 and 24 and the other end 26b of the switchover lever 26 is provided with elongated notches 27 and 28 mating with said spur gears 4 and 5. There is play between the end 26a of the switchover lever 26 and the recessed portion 25a and between the elongated notches 27 and 28 and the spur gears 4 and 5 so that the rotation of the gears 23, 24, 4 and 5 is not precluded by friction. When the switchover lever 26 slides axially along the shafts 3 and 25, the gears 23, 24, 4 and 5 which are in engagement with the gears 21, 22, 7 and 8, respectively, are moved axially. By the axial slide of the gears 23, 24, 4 and 5, the helical gears 21 and 22 are rotated in the opposite directions with respect to each other to cause the sectors 1 and 2 to change the angle of opening formed thereby, and one of the gears 4 and 5 is disengaged from the key 4a or 5a and the other gear is brought into engagement with the key.

The sector shaft 3 is further provided with a control plate 45 which has a notch 45a. The control plate 45 is fixed to the sector shaft 3 and said end 26b of the switchover lever 26 is provided with another notch 29 engaged with the control plate 45. Only when the notch 45a of the control plate 45 is in alignment with the notch 29 of the switchover lever 26, can the switchover lever 26 be moved axially to allow the axial movement of the gears 4 and 5. The control plate 45 is provided for the purpose of making a quick switchover by making it possible for the switchover lever 26 to axially move only when the key ways 4a and 5a of the gears 4 and 5 are aligned with the keys 41 and 51 on the shaft 3.

The sector shaft 3 is further provided with a stopper pin 30 at the end thereof so that the pin 30 is blocked by a stopper lever 31 when the stopper lever 31 is in its blocking position. The stopper lever 31 is pivotally mounted to a pivot 32 and spring biased in the clockwise direction by means of a tension spring 33 and normally urged to be in the blocking position as shown in FIG. 1. The stopper lever 31 has a bent portion 31a to be pushed by a shutter release button 34 overcoming the spring force of the spring 33. An electric switch 35 is provided to be closed by the stopper lever 31 when the lever 31 is pushed by the shutter button 34 and rotated counter-clockwise. The electric switch 35 is connected with said motor 10 so that the motor 10 for driving the mechanism may be driven only when the shutter button 34 is depressed.

In the construction as described hereinabove and shown in FIGS. 1 and 2, the ratio of the revolution number of the sector shaft 3 to that of the claw driving shaft 6 is set to be 1:1 when the gear engagement is between the gear 4 and the gear 7, and 1:2 when the gear engagement is between the gear 5 and the gear 8. Therefore, the ratio of the revolution number of the sector shaft 3 when the gear 4 transmits the revolution to that of the same when the other gear 5 transmits the revolution is 2:1. Further, when the switchover lever 26 is moved to put the key way 4a of the spur gear 4 into engagement with the key 41 and make the gear 4 transmit the revolution of the claw driving shaft 6 to the sector shaft 3, the helical gears 23 and 24 are axially moved to rotate the axially elongated helical gears 22 and 23 in the opposite directions with respect to each other to change the relative position of one sector 1 fixed to the helical gear 22 and the other sector 2 fixed to the sector shaft 3. In the embodiment shown in the drawings, by the switchover motion of the switch lever 26 from the gear 5 to the gear 4, the sectors 1 and 2 are rotated with respect to each other by 70° and the angle of opening formed by the two sectors 1 and 2 is reduced to 160° from 230°.

In operation of the above described mechanism for switching over the exposure time in a motion picture camera, when the shutter release button 34 is depressed the stopper lever 31 is rotated counterclockwise thereby and the switch 35 is closed to energize the motor 10. At the same time, the stopper pin 30 is released to allow the sector shaft 3 to rotate. Since the sector shaft 3 is associated with the claw driving shaft 6 driven by the motor 10 through a gear train comprising the gears 4 and 7 or gears 5 and 8, the sector shaft 3 starts to rotate by the power of the motor 10 transmitted thereto through the gears 11 and 9 and the gear train comprising gears 4 and 7 or 5 and 8 upon depression of the shutter release button 34. By the rotation of the claw driving shaft 6, the claw plate 14 is moved up and down through engagement of the eccentric pin 13 fixed to the end plate 12 of the shaft 6 and the horizontally extending slot 16 provided in the claw plate 14. Simultaneously, by the rotation of the sector shaft 3, the face cam 18, the sector 2 and the helical gear 21 fixed to the shaft 3 are rotated together. Further, through the gear engagement of said elongated helical gears 21 and 22 and helical gears 23 and 24, the elongated helical gear 22 and the sector 1 fixed thereto both rotatably mounted on the shaft 3 are rotated with respect to the elongated helical gear 21 and the sector 2.

Figure 3A:
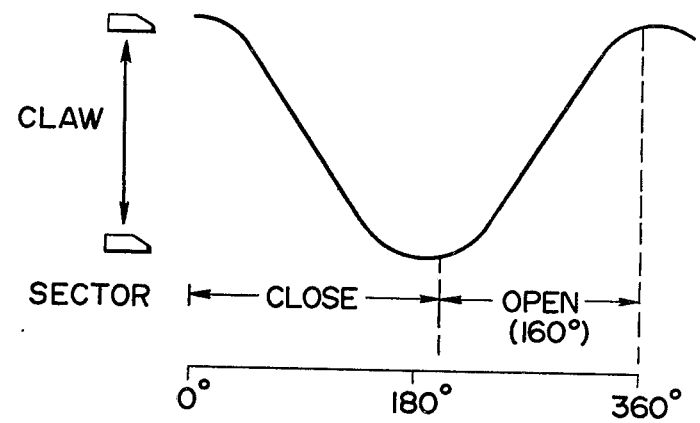
FIG. 3A is a graphical representation showing the motion of the claw of the motion picture camera in accordance with the present invention wherein the claw performs normal motion picture operation.
Figure 3B:
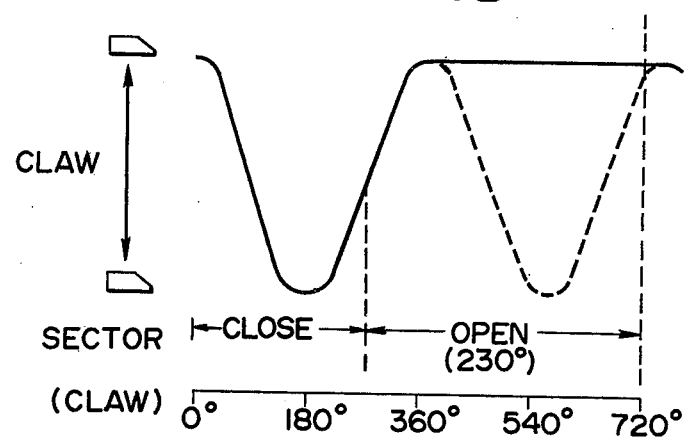
FIG. 3B is a graphical representation showing the motion of the claw of the motion picture camera in accordance with the present invention wherein the claw performs prolonged exposure time motion picture operation.
Figure 3C:
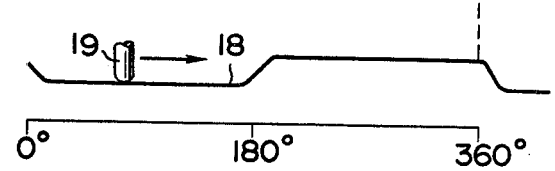
FIG. 3C is a graphical representation showing the motion of the cam follower which follows a claw control cam used in the motion picture camera of the present invention.

In the mode of normal motion picture operation in which the sector shaft 3 is associated with the claw driving shaft 6 through the gear train comprising the gears 4 and 7, the angle of opening formed by the sectors 1 and 2 is set to be 160° and the ratio of revolution of the two shafts 3 and 6 is set to be 1:1. In this case, while the claw driving shaft 6 rotates by 180° from the starting position (0°) to the half-rotated position thereof (180°), the cam follower pin 19 of the claw plate 14 follows the face cam 18 on the lower part thereof as shown in FIG. 3C and the claw 14a moves down to feed the film F by one frame. During this performance, the sectors 1 and 2 close the aperture A of the gate plate 17 as shown in FIG. 3A. While the claw driving shaft 6 rotates by another 180° from the half-rotated position (180°) to the fully rotated position (360°), the cam follower pin 19 of the claw plate 14 follows the face cam 18 on the higher part thereof as shown in FIG. 3C and the claw 14a moves upward to return to the starting position without contacting or being engaged with the film F. During this returning performance of the claw 14a, the sectors 1 and 2 open the aperture A of the gate plate 17 as indicated in FIG. 3A and expose the film F to the light coming through the taking lens of the camera.

In the mode of prolonged exposure time motion picture operation, the switchover lever 26 is axially slid along the sector shaft 3 and the gear 5 is put into engagement with said key 5a and the sector shaft 3 is brought into association with the claw driving shaft 6 through the gears 5 and 8. Accompanying the axial movement of the switchover lever 26, the helical gears 23 and 24 are axially moved to rotate the elongated helical gears 21 and 22 with respect to each other to enlarge the angle of opening formed by the sectors 1 and 2. By this movement, the angle of opening formed by the sectors 1 and 2 is enlarged to 230° from 160°. The ratio of the revolution number of the claw driving shaft 6 to that of the sector shaft 3 becomes 2:1. Therefore, the sector shaft 3 makes one revolution while the claw driving shaft 6 makes two revolutions. While the claw driving shaft 6 rotates by the first 360° and reciprocates the claw 14a by one cycle, the face cam 18 rotates by 180° as shown in FIGS. 3B and 3C. When the claw 14a returns upward while the cam follower pin 19 follows the lower part of the face cam 18, the claw 14a is automatically disengaged from the perforation of the film F owing to the tapered shape of the end of the claw 14a as shown in FIG. 1. In this performance, the claw 14a behaves as a so called free claw. When the claw 14a returns upward, the sectors 1 and 2 open the aperture A of the gate plate 17 as indicated in FIG. 3B. Then, the claw 14a moves up and down again in the other revolution of the claw driving shaft 6. During this reciprocal movement of the claw 14a, the cam follower pin 19 follows the higher part of the face cam 18 and reciprocates the claw 14a without making it engage with the perforation of the film F. During this performance, the sectors 1 and 2 open the aperture A and expose the film to the light through the taking lens (not shown) as indicated in FIG. 3B.

As will be understood from the above description, in accordance with the mechanism of the present invention, the switchover of the exposure time can simply be conducted by moving a slidable switchover lever.

In the above described embodiment of the invention, the following six combinations of the speed of revolution of the claw driving shaft and the sector shaft are obtained by using a driving motor having three different speeds, i.e. 24, 36 and 54 rps.

| Claw driving shaft speed (revolutions/sec) | 24 | 36 | 24 | 54 | 36 | 54 |
|---|---|---|---|---|---|---|
| Sector shaft speed (frame speed: frames/sec) | 12 | 18 | 24 | 27 | 36 | 54 |
| Angle of opening | 230 | 230 | 160 | 230 | 160 | 160 |

We claim:

1. In a motion picture camera employing a rotary shutter and a reciprocating film feed claw, an exposure time prolonging means comprising, in combination, a horizontally swingable and vertically slidable claw member having a claw which has a flat lower face and a tapered top face, said claw member having a horizontally extending guide slot and a cam follower pin, a claw driving shaft having at one end thereof an eccentric pin engaged with the slot of said claw member to move the claw member up and down by the rotation of the shaft, a sector shaft extending in parallel to said claw driving shaft, a first sector fixed to the sector shaft, a second sector rotatably mounted to the sector shaft for defining a fanshaped opening together with said first sector the angle of which is changeable, means interconnecting said first and second sectors for rotating one sector relative to the other sector to change the angle of said opening, a face cam concentrically fixed to said sector shaft and being in face contact with said cam follower pin to swing said claw member by the rotation thereof, an electric driving motor connected with one of said shafts for rotating the same, rotation transmitting means comprising a pair of selectively operable transmitting means for transmitting the rotation of said one shaft to the other shaft with different transmission ratios for selectively rotating said claw driving shaft at the same rate as said sector shaft or at a multiple thereof, and a switchover means for selectively activating one of said pair of transmitting means and said means interconnecting said first and second sectors.

2. An exposure time prolonging means in a motion picture camera as defined in claim 1 wherein said rotation transmitting means comprises two gears fixed to one of said shafts and two more gears meshed with said two gears respectively and selectively engaged with the other shaft.

3. An exposure time prolonging means in a motion picture camera as defined in claim 2 wherein the transmission ratio of one of said selectively operable transmitting means is 1:1 and that of the other is 2:1, and when the latter transmission ratio is effected the claw driving shaft makes two revolutions while the sector shaft makes one revolution.

4. An exposure time prolonging means in a motion picture camera as defined in claim 3 wherein the angle of opening formed by the sectors is enlarged upon switchover of the rotation transmitting means from one having the transmission ratio of 1:1 to the other having the transmission ratio of 2:1.

5. An exposure time prolonging means in a motion picture camera as defined in claim 1 wherein said second sector is fixed to an elongated helical gear rotatably mounted to the sector shaft and another elongated helical gear is fixed to the sector shaft, the direction of helixes of said one helical gear being opposite to that of the other helical gear, and two axially slidable helical gears fixed to each other and haing oppositely directed helixes are meshed with said elongated helical gears respectively so that the axial movement of the helical gears causes relative rotation of said elongated helical gears.

* * * * *